(12) United States Patent
Huang

(10) Patent No.: US 8,375,791 B2
(45) Date of Patent: Feb. 19, 2013

(54) CAPACITIVE MEMS GYROSCOPE AND METHOD OF MAKING THE SAME

(75) Inventor: Herb He Huang, Shanghai (CN)

(73) Assignee: Shanghai Lexvu Opto Microelectronics Technology Co., Ltd., Shanghai (CN)

( * ) Notice: Subject to any disclaimer, the term of this patent is extended or adjusted under 35 U.S.C. 154(b) by 289 days.

(21) Appl. No.: 12/834,250

(22) Filed: Jul. 12, 2010

(65) Prior Publication Data

US 2011/0005319 A1   Jan. 13, 2011

Related U.S. Application Data

(60) Provisional application No. 61/224,969, filed on Jul. 13, 2009.

(51) Int. Cl.
*G01C 19/56* (2006.01)
(52) U.S. Cl. ............. 73/504.12; 73/504.04; 73/504.08
(58) Field of Classification Search ............. 73/504.02, 73/504.04, 504.08, 504.09, 504.11, 504.12, 73/504.13, 504.18
See application file for complete search history.

(56) References Cited

U.S. PATENT DOCUMENTS

| | | | |
|---|---|---|---|
| 4,841,773 A * | 6/1989 | Stewart | 73/510 |
| 5,783,749 A * | 7/1998 | Lee et al. | 73/504.12 |
| 5,911,156 A | 6/1999 | Ward et al. | |
| 5,932,804 A * | 8/1999 | Hopkin et al. | 73/504.13 |
| 5,952,572 A | 9/1999 | Yamashita et al. | |
| 5,992,233 A | 11/1999 | Clark | |
| 6,067,858 A | 5/2000 | Clark et al. | |
| 6,155,115 A * | 12/2000 | Ljung | 73/504.12 |
| 6,308,567 B1 * | 10/2001 | Higuchi et al. | 73/504.12 |
| 6,349,597 B1 * | 2/2002 | Folkmer et al. | 73/504.02 |
| 6,367,326 B1 * | 4/2002 | Okada | 73/504.12 |
| 6,393,913 B1 | 5/2002 | Dyck et al. | |
| 6,526,826 B2 | 3/2003 | Kurachi et al. | |
| 6,796,178 B2 | 9/2004 | Jeong et al. | |
| 6,796,179 B2 * | 9/2004 | Bae et al. | 73/504.12 |
| 6,901,799 B2 * | 6/2005 | Chen et al. | 73/504.13 |
| 6,952,965 B2 | 10/2005 | Kang et al. | |
| 2006/0112764 A1 * | 6/2006 | Higuchi | 73/504.12 |

* cited by examiner

*Primary Examiner* — Helen C. Kwok
(74) *Attorney, Agent, or Firm* — J.C. Patents

(57) ABSTRACT

A capacitive MEMS gyroscope and a method of making the same are disclosed. The capacitive MEMS gyroscope comprises a semiconductor substrate and a suspended composite wheel. The semiconductor substrate comprises: a read-out circuitry; at least one bottom electrode disposed on top of the semiconductor substrate, centered to a rotation axis and electrically connected to the read-out circuitry; at least one contact pad disposed on the top of the semiconductor substrate, electrically to the read-out circuitry; the composite wheel, partially made of dielectric film and configured in suspension above and in parallel to the semiconductor substrate and centered to the rotation axis, comprises: at least one top electrode disposed on the composite wheel, aligned vertically with one of the bottom electrode, electrically to the read-out circuitry; at least one circumferential spring centered to the rotation axis, bridging the composite wheel and the semiconductor substrate and consisting of at least one top electrode which electrically connects the top electrode to the contact pad on the semiconductor substrate. The gyroscope of the present invention formed by depositing and photolithographically patterning has miniaturized size, low tolerance scope and high sensing accuracy, as well as low fabrication costs owing to special bulk MEMS fabrication device unnecessary.

11 Claims, 6 Drawing Sheets

CAPACITIVE MEMS GYROSCOPE AND METHOD OF MAKING THE SAME

CROSS-REFERENCE TO RELATED APPLICATIONS

This application claims priority of U.S. provisional application No. 61/224,969, filed on Jul. 13, 2009, entitled "CAPACITIVE MEMS GYROSCOPE AND METHOD OF MAKING THE SAME", which is incorporated herein by reference in its entirety.

FIELD OF THE TECHNOLOGY

The present invention relates to micro gyroscopic devices and particularly to a capacitive micro electrical-mechanical system (MEMS) gyroscope and a method of making the same.

BACKGROUND

Typically a micro gyroscope contains a set of pairing circumferential comb-shaped microstructures with plurality of fine fingers spaced apart but interwoven to form one or several capacitors sensing the rotation and angular acceleration of the carrying substrate on which the set of paring circumferential comb-shaped microstructures are mechanically suspended.

Such a micro gyroscope is commonly processed through a so-called bulk MEMS fabrication process, which employs deep reactive ion etch (DRIE) through the thickness of a silicon wafer, typically hundreds of micro meter thick. The fundamentals of such bulk MEMS fabrication process limit the process tolerance of lateral dimensions and therefore, the sensing accuracy with the two circumferential comb-shaped microstructures in pair as sensing capacitors. Furthermore, such a micro gyroscopic device is very difficult to be miniaturized like silicon-based microelectronic devices and also, incurs bottomline fabrication costs because the fabrication needs special bulk MEMS fabrication device.

SUMMARY

The present invention discloses a capacitive MEMS gyroscope to solve the problem associated with low sensing accuracy, difficulties in miniaturizing and high fabrication costs.

The present invention provides a capacitive MEMS gyroscope, comprising a semiconductor substrate and a suspended composite wheel; wherein the semiconductor substrate centered to a rotation axis comprises: a read-out circuitry; at least one bottom electrode disposed on top of the semiconductor substrate and electrically connected to the read-out circuitry; at least one contact pad disposed on the top of the semiconductor substrate, electrically to the read-out circuitry; the composite wheel, partially made of dielectric film and configured in suspension above and in parallel to the semiconductor substrate and centered to the rotation axis, comprises: at least one top electrode disposed on the composite wheel, aligned vertically with one of the bottom electrode, electrically to the read-out circuitry; at least one circumferential spring centered to the rotation axis, physically bridging the composite wheel and the semiconductor substrate and consisting of at least one top electrode lead which electrically the top electrode to the contact pad on the semiconductor substrate.

The present invention further provides a method of making the capacitive MEMS gyroscope above-mentioned, comprising:

providing the semiconductor substrate with read-out circuitry formed on;

depositing and photolithographically forming the bottom electrode and the contact pad on top of the semiconductor substrate;

depositing and photolithographically patterning a first sacrificial film on the semiconductor substrate;

depositing and photolithographically forming the top electrode and the top electrode lead;

depositing and photolithographically patterning the suspend composite wheel;

removing the first sacrificial film.

In the present invention, the top electrode on the composite wheel and the bottom electrode on the semiconductor substrate form a plate capacitor, the composite wheel can rotate around the rotation axis, and therefore, a capacitive MEMS gyroscope is formed. The composite wheel may be formed on the semiconductor substrate by depositing and photolithographically patterning. The gyroscope formed by depositing and photolithographically patterning has miniaturized size, low tolerance scope and high sensing accuracy, as well as low fabrication costs owing to special bulk MEMS fabrication device unnecessary.

BRIEF DESCRIPTION OF THE DRAWINGS

The disclosure may be more completely understood in consideration of the following detailed description of various embodiments in connection with the accompanying drawings, in which.

DETAILED DESCRIPTION

The drawings for illustration are not necessarily to scale, emphasis instead being placed upon illustrating the framework and principles of the disclosed invention. In the following description, reference is made to the accompanying drawings which form a part of the specification, and which show, by way of illustration, embodiments of the present invention. It is understood that other embodiments may be utilized and structural changes may be made without departing from the scope and spirit of the present invention.

Figure 1A:
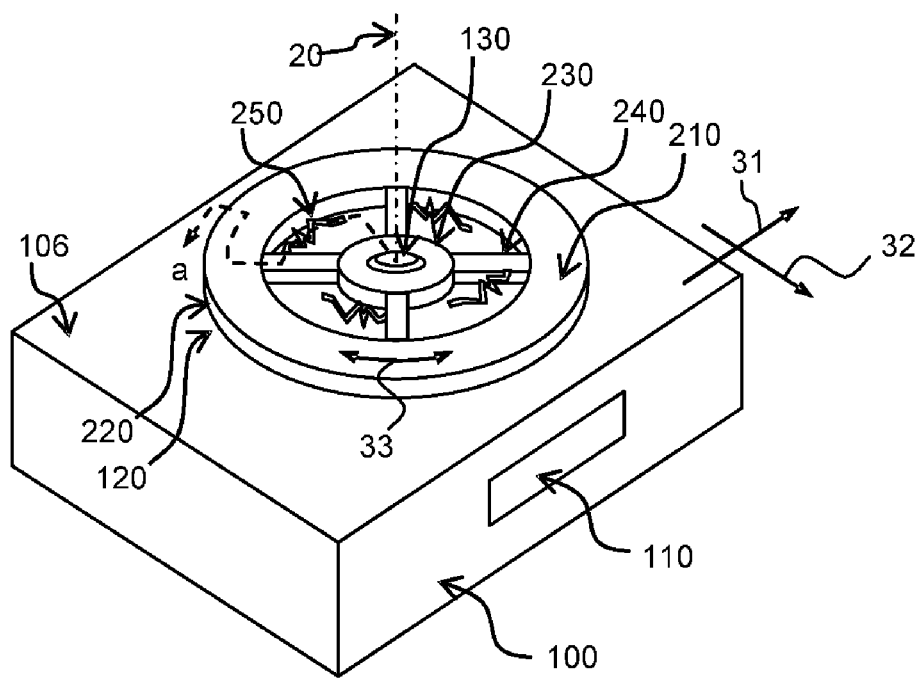
FIG. 1a is a birds' eye view of a capacitive MEMS gyroscope in one embodiment of the present invention.
Figure 1B:
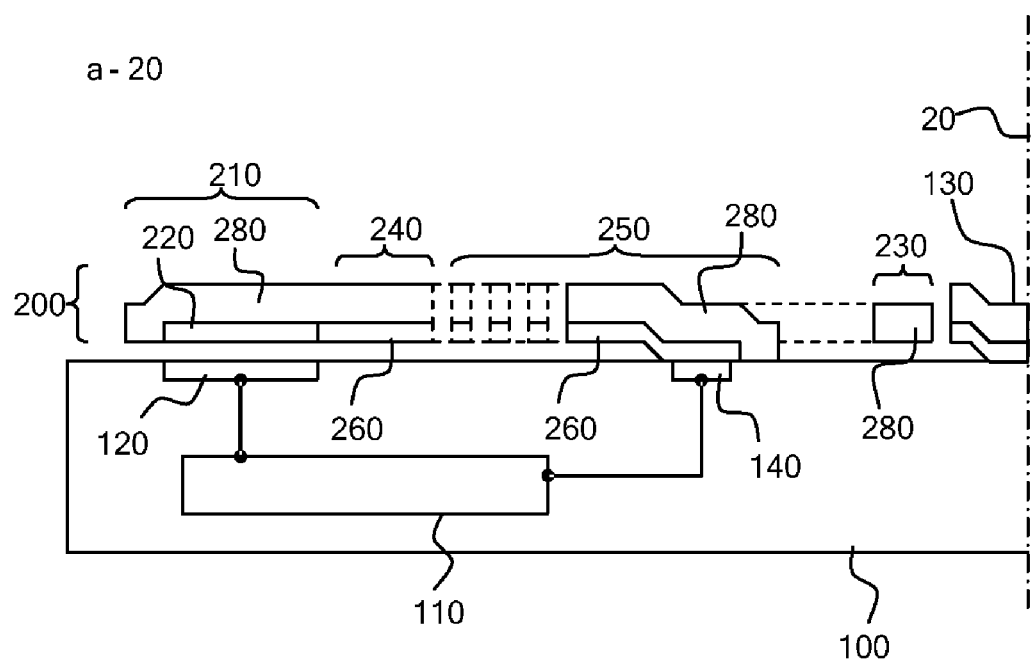
FIG. 1b is a cross sectional view of FIG. 1a along the zigzag path a-20.

FIG. 1a is a birds' eye view of a capacitive MEMS gyroscope in one embodiment of the present invention, and FIG. 1b is a cross sectional view of FIG. 1a along the zigzag path a-20. As shown in FIG. 1a, the capacitive MEMS gyroscope comprises two main components: a semiconductor substrate 100 centered to a rotation 20 and a suspended composite wheel 200. The composite wheel 200 can be partially made of dielectric film and configured in suspension above and in parallel to the semiconductor and centered to the rotation axis 20. Substantial portion of the composite wheel 200 is suspended above the semiconductor substrate 100.

The semiconductor substrate contains a read-out circuitry 110 underneath the top surface 106 of the semiconductor substrate 100, which is readily produced before further fabricating the suspended composite wheel 200.

The semiconductor substrate 100 may be made from any or combination of semiconductor materials including but not limited to: silicon, germanium, gallium and arsenic. In one of the preferred embodiments, the semiconductor substrate 100 is a single crystal silicon wafer and the read-out circuitry 110 consists of complementary metal oxide semiconductor (CMOS) devices.

The semiconductor substrate 100 further comprises at least one bottom electrode 120 and at least one contact pad 140. The bottom electrode 120 is disposed on the top surface 106 of the semiconductor substrate 100, centered to the rotation axis and electrically connected to the read-out circuitry 110. The contact pad 140 is disposed on the semiconductor substrate 100 and electrically connected to the read-out circuitry 110.

The composite wheel comprises at least one top electrode 220 and at least one circumferential spring arm 250. The top electrode 220 is disposed underneath the composite wheel 200, in vertical alignment with the bottom electrode 120, and electrically connected to the read-out circuitry 110. The at least one circumferential spring arm 250, centered to the rotation axis, is attached to the composite wheel 200 at one end and to the semiconductor substrate 100 at the other end, and consists of at least one top electrode lead 260 which electrically connects the top electrode to the contact pad 140 on the semiconductor substrate 100.

The suspended composite wheel 200 is a movable MEMS component, which may comprise an out ring 210, an inner ring 230 and at least two radial beams 240 bridging the out ring 210 and the inner ring 230. The out ring 210, the inner ring 230 and the radial beams 240 are centered to the rotation axis 20. The suspended composite wheel 200 is anchored onto the top surface 106 of the semiconductor substrate 100 via the circumferential spring arm 250, as the circumferential spring arm 250 is attached to the radial beams 240 at one end and to the contact pad 140 on the semiconductor substrate 100 at the other end.

Surrounding a protruding circular central island 130 fixed onto the semiconductor substrate 100 and centered to the rotation axis 20, the inner ring 230 and thus, the whole suspended composite wheel 200 are constrained from linear movement and motion parallel to the semiconductor substrate 100, either in a first horizontal direction 31 or a second horizontal direction 32 orthogonal to the first horizontal direction 31, bur free of angular rotation around the rotation axis 20 along a circumferential direction 33, as shown in FIG. 1a. The protruding circular central island is made from any or combination of metals and semiconductors, including aluminum, titanium, tantalum, copper, cobalt, nickel, platinum and tungsten, as well as silicon, germanium, and silicon germanium, and the dielectric material from any or combination of silicon oxide, nitride, oxynitride, carbon oxynitride, carbide and metal oxides.

As shown in FIG. 1b, the composite wheel 200 comprises at least one top electrode 220 underneath the out ring 210 and in vertical alignment with the bottom electrode 120 on the semiconductor substrate 100. The top electrode 220 and the bottom electrode 120 form pairs of plate capacitors. Each of the paired plate capacitors has effective plate capacitance depending on the overlap area between the pair of a top electrode 220 and a bottom electrode 120. The top electrode 220 is connected electrically to the contact pad 140 thorough the top electrode lead 260, which are physically disposed underneath the radial beams 240 and the circumferential spring arm 250, and eventually to the read-out circuitry 110 on the semiconductor substrate 100.

As the semiconductor substrate 100 experiences angular acceleration around the rotation axis 20, the inertia of the suspended composite wheel 200 leads to the rotation of the suspended composite wheel 200 relative to the semiconductor substrate 100 along the circumferential direction 33. Therefore angular misalignment of the top electrode 220 and the bottom electrode 120 in pairs is induced and, therefore, change with time in the overlapped areas and thus in the effective plate capacitance is also induced. Such change in the effective plate capacitance with time is measured by the read-out circuitry 110 and converted to the history of angular acceleration, momentum and/or rotation angle as disclosed in the prior art and employed in known industrial practice.

Preferably, in one embodiment, the bottom electrode 120 and the contact pad 140 on the semiconductor substrate 100 are formed from an identical conductive thin film stack on the semiconductor substrate 100, made of available thin film metallurgical materials commonly used in silicon wafer fabrication process, including but not limited to: aluminum, titanium, tantalum, copper, cobalt, nickel, platinum, tungsten, and their alloys. And the same is applicable to the top electrode 220 and the top electrode leads 260 underneath the suspended composite wheel 200.

The outer ring 210, inner ring 230, the radial beams 240, and the circumferential spring arm 250 can be made from any or combination of metals, including aluminum, titanium, tantalum, copper, cobalt, nickel, platinum and tungsten and their alloys, and dielectric materials, including silicon oxide, nitride (for example, silicon nitride), oxynitride, carbon oxynitride, carbide and metal oxides.

In one embodiment, the suspended composite wheel 200 may further include a dielectric layer 280 for enhancing mechanical properties through composition of at least two layers of different thin film materials as well as electrical isolation between the electrodes and conductors. The dielectric layer 280 can also be made from available dielectric thin film materials including but not limited to: silicon oxide, silicon nitride, silicon oxynitride, silicon carbide, aluminum oxide, aluminum nitride, titanium oxide and titanium nitride, tantalum oxide and tantalum nitride. Such composite thin film microstructure in the composition of an inorganic compound thin film with a metal thin film substantially enhances the mechanical aspects of the suspended composite wheel 200, including stiffness and toughness against fatigue and shock. Such composition also offers means for balancing the thermal expansion mismatch and residual stresses among different films.

For reducing the elastic spring stiffness of the circumferential spring arm 250 along the circumferential direction, the circumferential spring arm 250 are preferably shaped in a zigzag configuration along the circumference centered to the rotation axis 20, as shown in FIG. 1a.

In the capacitive MEMS gyroscope of the present invention, the top electrode on the composite wheel and the bottom electrode on the semiconductor substrate form a plate capacitor, the composite wheel can rotate around the rotation axis, and therefore, a capacitive MEMS gyroscope is formed. The composite wheel may be formed on the semiconductor substrate by depositing and photolithographically patterning. The gyroscope formed by depositing and photolithographically patterning has miniaturized size, low tolerance scope and high sensing accuracy, as well as low fabrication costs owing to special bulk MEMS fabrication device unnecessary.

Figure 2:
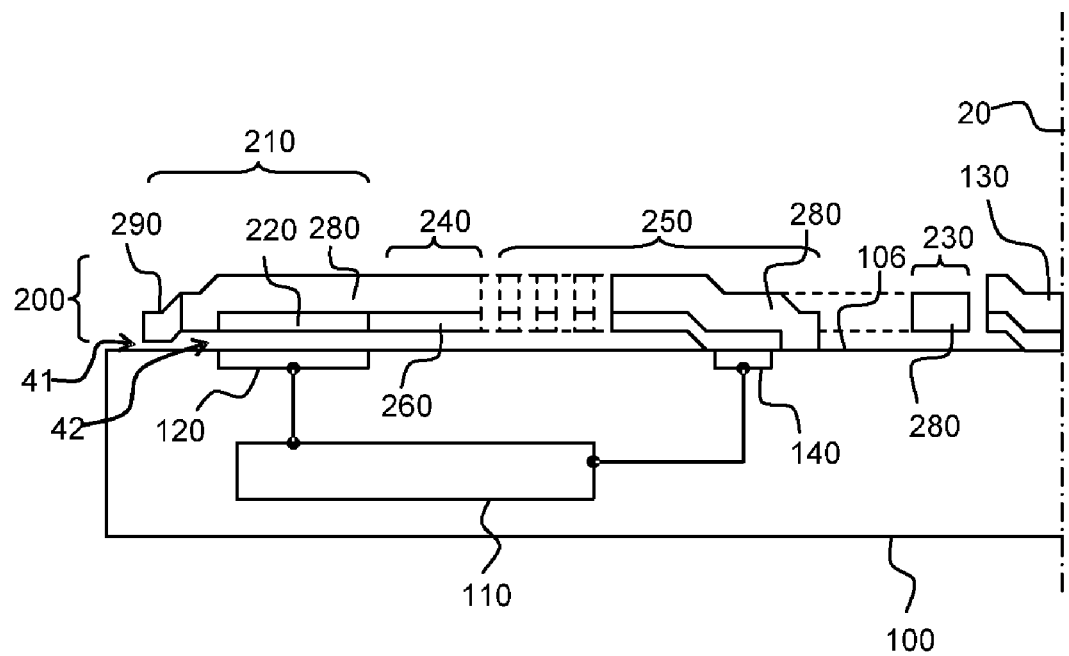
FIG. 2 is a cross sectional view of a capacitive MEMS gyroscope in another embodiment of the present invention.

FIG. 2 is a cross sectional view of a capacitive MEMS gyroscope in another embodiment of the present invention.

Compared with the FIG. 1a and 1b, the composite wheel 200 in FIG. 2 further comprises at least one vertical space limiter 290, preferably configured at the outer edge of the outer ring 210, having a first vertical distance 41 with the top surface 106 of the semiconductor substrate 100. The first vertical distance 41 is configured substantially smaller than a second vertical distance 42 of the rest of the suspended composite wheel 200 with the top surface 106 of the semiconductor substrate 100.

In the embodiment of FIG. 2, the first vertical distance 41 between the vertical space limiter 290 and the semiconductor substrate 100 is configured substantially smaller than a second vertical distance 42 of the rest of the suspended composite wheel 200 with the top surface 106 of the semiconductor substrate 100, therefore, the vertical space limiter 290 physically prevent the suspended composite wheel 200 from touching and even being stuck onto the top surface of the semiconductor substrate 100.

FIGS. 3a, 3b, 3c and 3d are a sequence of cross-sectional views of a method of making a capacitive MEMS gyroscope in one embodiment of the present invention. The method of making a capacitive MEMS gyroscope in one embodiment of the present invention comprises the following steps.

The semiconductor substrate 100 with the read-out circuitry 110 is provided readily first.

Figure 3A:
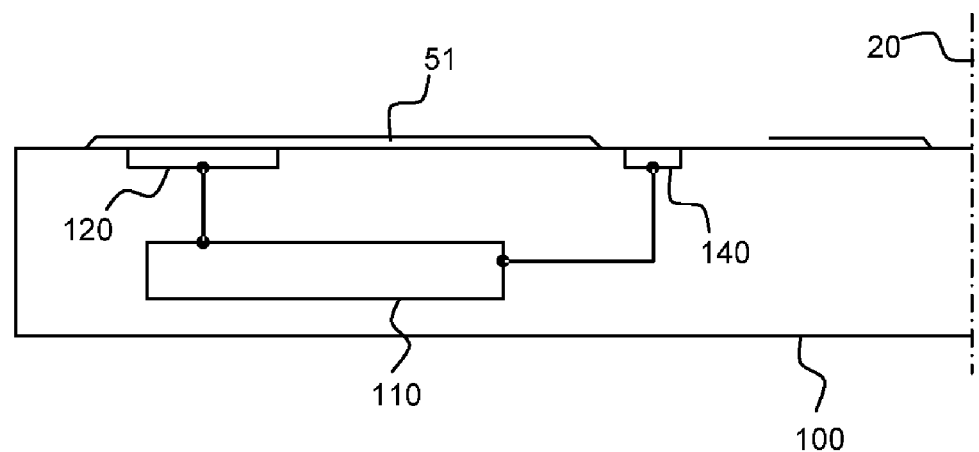
FIGS. 3a, 3b, 3c and 3d are a sequence of cross-sectional views of a method of making a capacitive MEMS gyroscope in one embodiment of the present invention.

The bottom electrode 120 and the contact pad 140 are fabricated through thin film deposition and photolithographically patterning processes, as shown in FIG. 3a.

A first sacrificial film 51 is fabricated through deposition and photolithographically patterning processes. The first sacrificial film 51 is photolithographically patterned and etched to form etch-removed areas onto part having the second vertical distance 42. The first sacrificial film 51 is photolithographically patterned to etch open portion onto the semiconductor substrate 100 for anchoring the suspended composite wheel to be formed, as shown in FIG. 3b.

The top electrode 220 and top electrode lead 260 are fabricated through deposition and photolithographically patterning processes. For example, on top of the first sacrificial film 51 on the semiconductor substrate 100, a top metal film is deposited and photolighographically patterned to form the top electrode 220 and the top electrode lead 260.

Figure 3B:
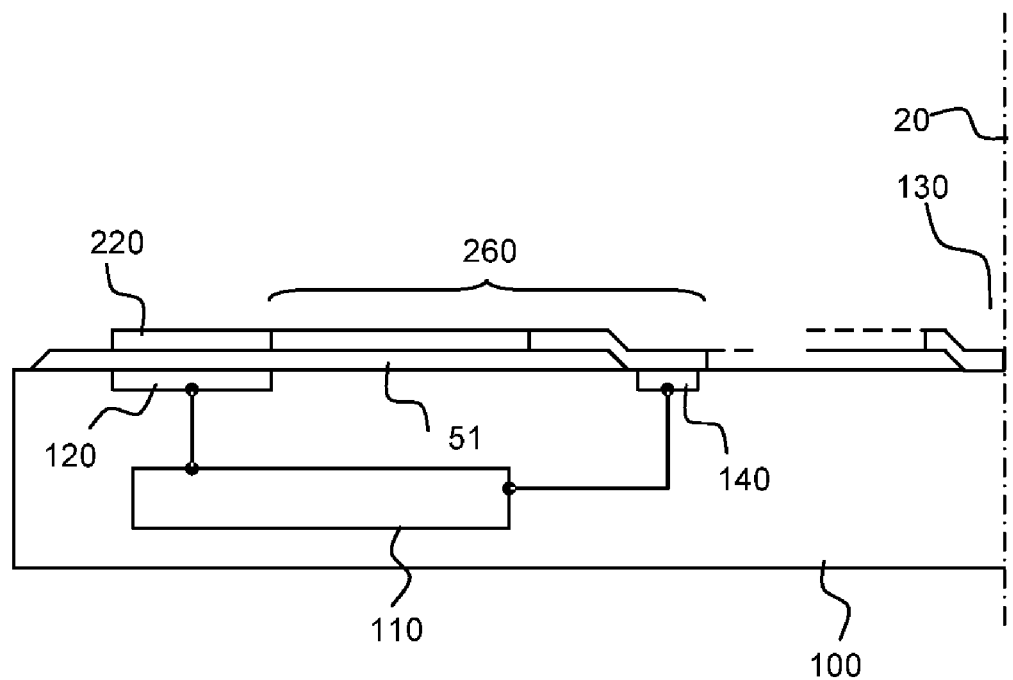

.On the top of the area of the protruding circular central island 130, there is also metal film, as shown in FIG. 3b.

The composite wheel 200 are fabricated on the semiconductor substrate 100.

Figure 3C:
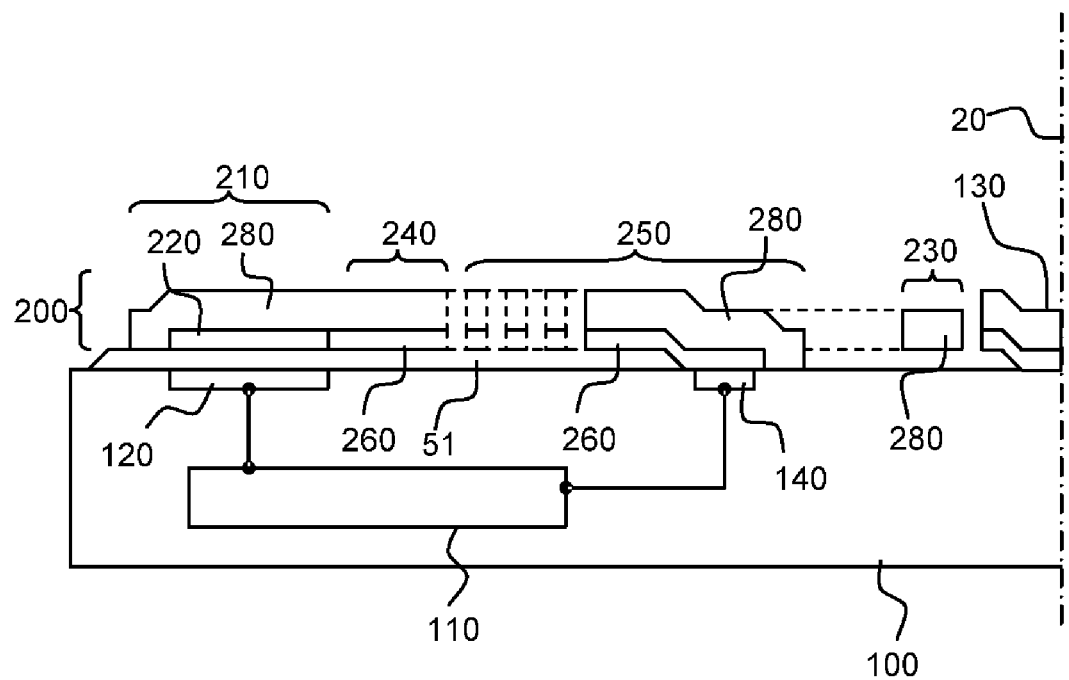

Concretely, a dielectric layer 280 is deposited on the semiconductor substrate with the top electrode 220 formed, and photolighographically patterned to form the inner ring 230, the outer ring 210, the radial beams 240, the circumferential spring arm 250 and the protruding circular central island 130, as shown in FIG. 3c.

Figure 3D:
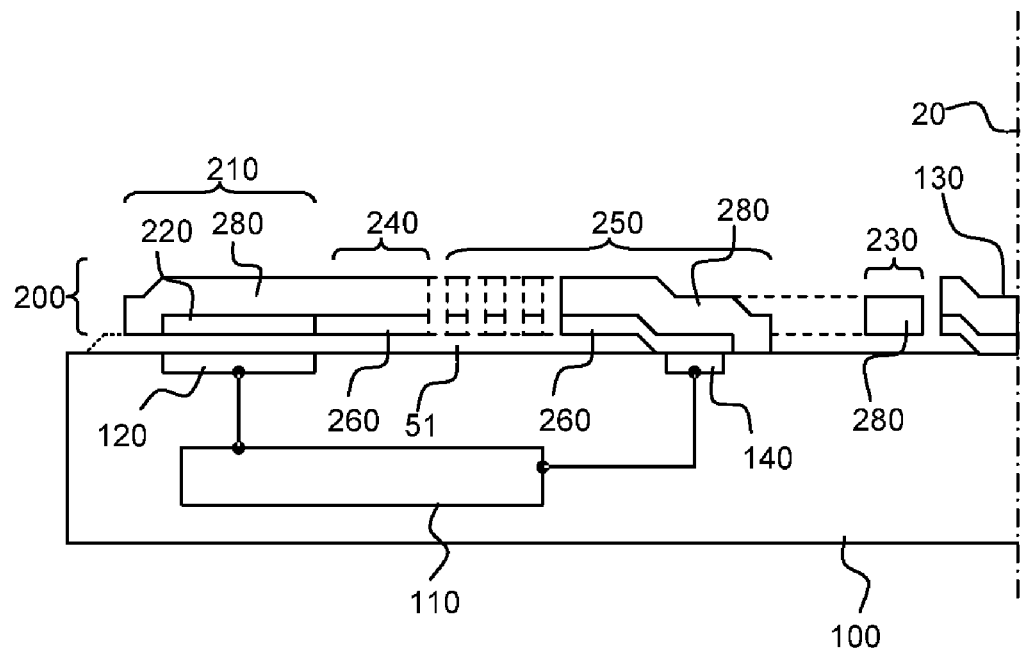

Then the first sacrificial film 51 is removed selectively, as shown in FIG. 3d.

FIGS. 4a, 4b, 4c, 4d and 4e are a sequence of cross-sectional views of a method of making a capacitive MEMS gyroscope in another embodiment of the present invention. The difference between this embodiment and the previous embodiment of the method is that two sacrificial films are formed in this embodiment, as well as the vertical space limiter 290.

Figure 4A:
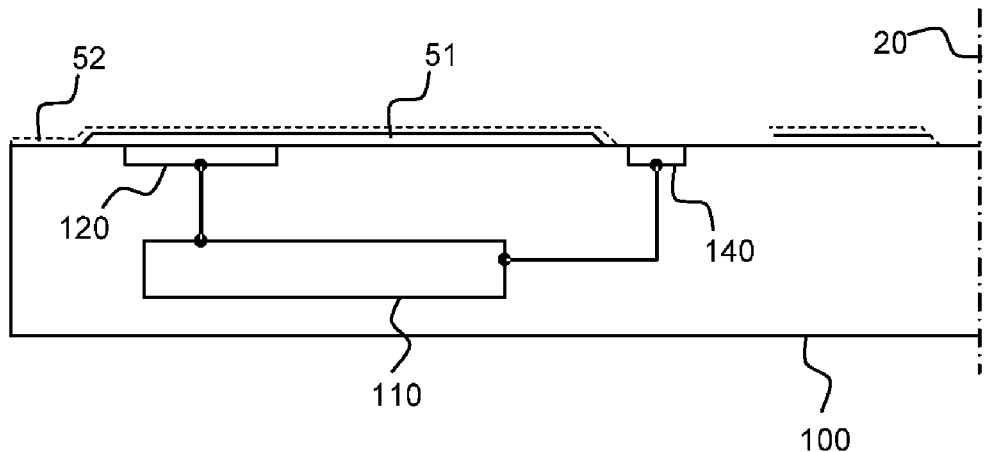
FIGS. 4a, 4b, 4c, 4d and 4e are a sequence of cross-sectional views of a method of making a capacitive MEMS gyroscope in another embodiment of the present invention.

In this embodiment, a second sacrificial film 52 is deposited on the top of the remaining first sacrificial film 51 and the exposed portion of the bottom electrode 120, covering the first sacrificial film 51, preferably covering the contact pad 140. The composite film including the first sacrificial film 51 and the second sacrificial film 52 is photolighographically patterned to etch open portion onto the semiconductor substrate 100 for anchoring the suspended composite wheel 200 to be formed, as shown in FIG. 4a.

Figure 4B:
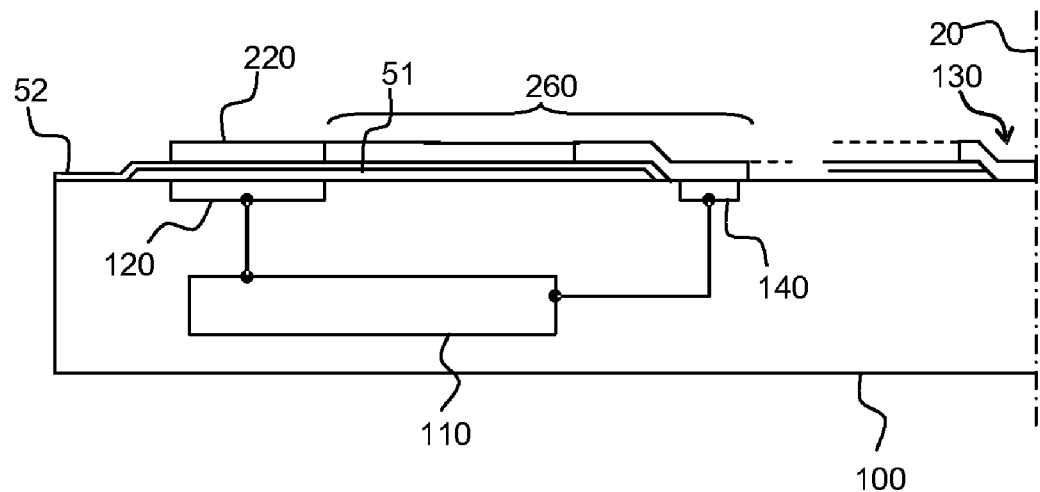

On top of the patterned composite film including the first sacrificial film 51 and the second sacrificial film 52, a top metal film is deposited and photolighographically patterned to form the top electrode 220 and the top electrode leads 260, as well as the bottom portion of the protruding circular central island 130, as shown in FIG. 4b.

Figure 4C:
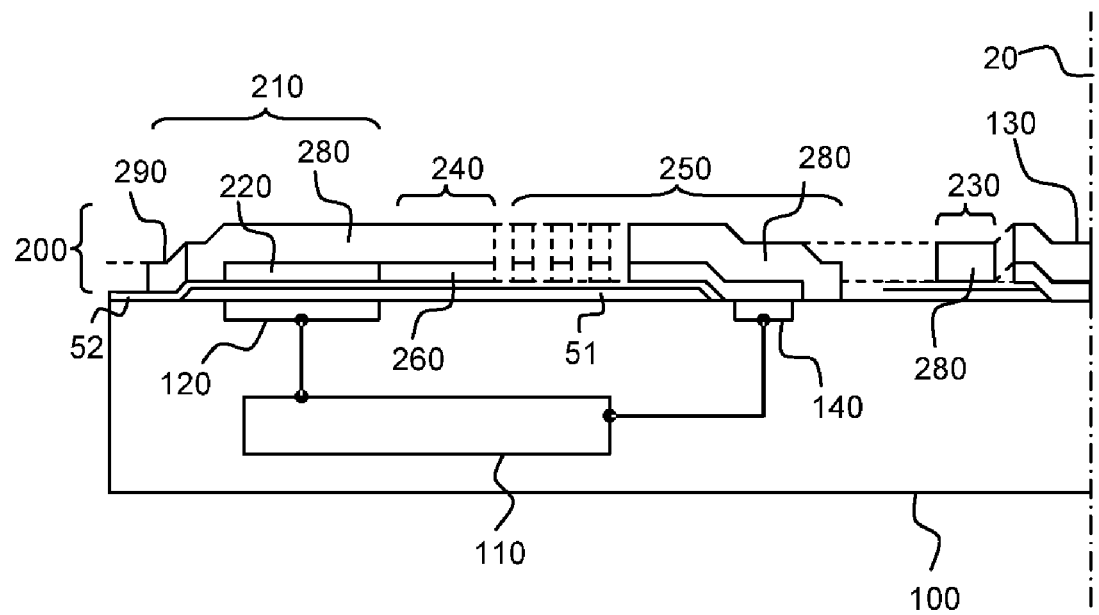

A dielectric layer 280 is deposited on the semiconductor substrate 100 after the top electrode 220 formed, and is photolighographically patterned to form the inner ring 230, the outer ring 210, the radial beams 240, the circumferential spring arm 250, the vertical space limiter 290 and the protruding circular central island 130, as shown in FIG. 4c.

In FIG. 4c, there is the first vertical distance 41 between the vertical space limiter 290 and the semiconductor substrate 100, which is smaller than the second vertical distance 42 between the rest of the suspended composite wheel 200 and the semiconductor substrate 100, and therefore, the vertical space limiter 290 physically prevent the suspended composite wheel 200 from touching and even being stuck onto the top surface of the semiconductor substrate 100.

Figure 4D:
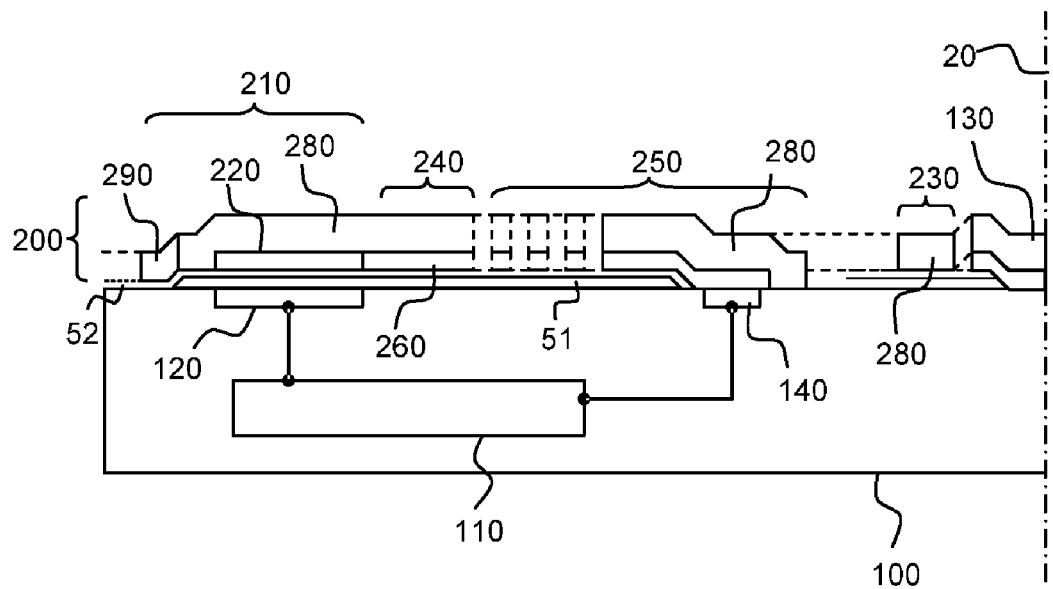
Figure 4E:
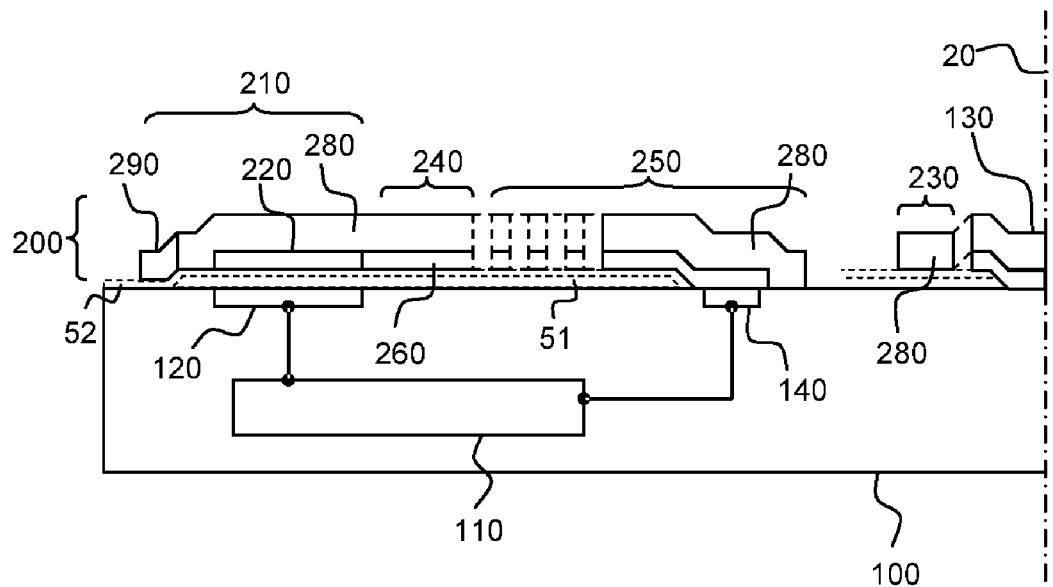

The second sacrificial film 52 is selectively removed, as shown in FIG. 4d. The first sacrificial film 51 is selectively removed, as shown in FIG. 4e. The selective removal of the first sacrificial film 51 and the second sacrificial film 52 may be accomplished typically in a reactor chamber containing oxygen or nitrogen gas and plasma generated with a plasma source power.

In the embodiments of the present invention, the first sacrificial film 51 and the second sacrificial film 52 may be carbon films. The first sacrificial film 51 and the second sacrificial film 52 are deposited through carbon deposition wafer processing steps, including: 1) placing the semiconductor substrate 100 in a reactor chamber; 2) introducing a carbon-containing process gas into the chamber and introducing a layer-enhancing additive gas that enhances thermal properties of the first sacrificial film 51 and the second sacrificial film 52; 3) generating a reentrant toroidal radio frequency (RF) plasma current in a reentrant path that includes a process zone overlying the semiconductor substrate 100 by coupling a plasma RF source power to an external portion of the reentrant path; and 4) coupling RF plasma bias power or bias voltage to the semiconductor substrate 100.

In the method of the present invention, the top electrode on the composite wheel and the bottom electrode on the semiconductor substrate form a plate capacitor, the composite wheel can rotate around the rotation axis, and therefore, a capacitive MEMS gyroscope is formed. The composite wheel may be formed on the semiconductor substrate by depositing and photolithographically patterning. The gyroscope formed by depositing and photolithographically patterning has miniaturized size, low tolerance scope and high sensing accuracy, as well as low fabrication costs owing to special bulk MEMS fabrication device unnecessary.

And the first sacrificial film and the second sacrificial film are carbon films, the top electrode and the top electrode lead are fabricated on the composite film including the first sacrificial film and the second sacrificial film, which provides good mechanical and physical support for the suspended composite wheel.

Further more, carbon film used as sacrificial film enables available metallurgy including aluminum, titanium and their alloys on the silicon CMOS process platform and material selection for dielectric thin films including oxide, nitride and even carbides. This expanded metallurgy and composite thin film capability provides improved mechanical stiffness and toughness against fatigue and shock, as well as reliable contact interfaces for electrical-mechanical signal sensing of an angular moment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A capacitive MEMS gyroscope, comprising a semiconductor substrate and a suspended composite wheel; wherein the semiconductor substrate centered to a rotation axis, comprises:
    a read-out circuitry;
    at least one bottom electrode disposed on top of the semiconductor substrate electrically connected to the read-out circuitry;
    at least one contact pad disposed on the top of the semiconductor substrate, electrically to the read-out circuitry;
    the composite wheel, partially made of dielectric film and configured in suspension above and in parallel to the semiconductor substrate and centered to the rotation axis, comprises:
    at least one top electrode disposed on the composite wheel, aligned vertically with one of the bottom electrode, electrically to the read-out circuitry;
    at least one circumferential spring arm centered to the rotation axis, physically bridging the composite wheel and the semiconductor substrate and consisting of at least one top electrode lead which electrically connects the top electrode to the contact pad on the semiconductor substrate.

2. The capacitive MEMS gyroscope according to claim 1, wherein the semiconductor substrate further comprises a protruding circular central island from the semiconductor substrate;
    the composite wheel further comprises:
    an outer ring centered to the rotation axis;
    an inner ring centered to the rotation axis and surrounding the protruding circular central island; and
    at least two radial beams physically connecting the inner ring to the outer ring from the rotation axis.

3. The capacitive MEMS gyroscope according to claim 2, wherein the at least one circumferential spring arm bridges the radial beams to the semiconductor substrate at the at least one contact pad.

4. The capacitive MEMS gyroscope according to claim 1, wherein the semiconductor substrate is made from any or combination of semiconductor materials including silicon, germanium, gallium and arsenic.

5. The capacitive MEMS gyroscope according to claim 1, wherein the at least one bottom electrode and contact pad are made from any or combination of aluminum, titanium, tantalum, copper, cobalt, nickel, platinum, tungsten, and their alloys.

6. The capacitive MEMS gyroscope according to claim 1, wherein the at least one top electrode and top electrode lead are made from any or combination of aluminum, titanium, tantalum, copper, cobalt, nickel, platinum, tungsten, and their alloys.

7. The capacitive MEMS gyroscope according to claim 2, wherein the inner ring, the radial beams, and the circumferential spring arm are made from any or combination of metals, including aluminum, titanium, tantalum, copper, cobalt, nickel, platinum and tungsten, and dielectric materials, including silicon oxide, nitride, oxynitride, carbon oxynitride, carbide and metal oxides.

8. The capacitive MEMS gyroscope according to claim 2, wherein the protruding circular central island is made from any or combination of metals and semiconductors, including aluminum, titanium, tantalum, copper, cobalt, nickel, platinum and tungsten, as well as silicon, germanium, and silicon germanium, and the dielectric material from any or combination of silicon oxide, nitride, oxynitride, carbon oxynitride ,carbide and metal oxides.

9. The capacitive MEMS gyroscope according to claim 1, wherein the composite wheel further comprises at least one vertical space limiter, configured at an outer edge of the composite wheel, having a first spacing smaller than a second vertical spacing of the rest of the suspended composite wheel with the semiconductor substrate.

10. The capacitive MEMS gyroscope according to claim 1, wherein the read-out circuitry comprises complementary metal oxide semiconductor devices.

11. The capacitive MEMS gyroscope according to claim 1, wherein the at least one circumferential spring arm is shaped in a zigzag configuration along a circumference centered to the rotation axis.

* * * * *